(12) United States Patent  
Pariseau

(10) Patent No.: US 12,044,611 B2
(45) Date of Patent: Jul. 23, 2024

(54) PARTICLE COUNTER WITH INTEGRATED BOOTLOADER

(71) Applicant: Particles Plus, Inc., Stoughton, MA (US)

(72) Inventor: David Pariseau, Los Altos, CA (US)

(73) Assignee: Particles Plus, Inc., Stoughton, MA (US)

( * ) Notice: Subject to any disclaimer, the term of this patent is extended or adjusted under 35 U.S.C. 154(b) by 0 days.

(21) Appl. No.: 17/233,204

(22) Filed: Apr. 16, 2021

(65) Prior Publication Data

US 2022/0042899 A1   Feb. 10, 2022

Related U.S. Application Data

(60) Division of application No. 16/537,492, filed on Aug. 9, 2019, now Pat. No. 11,169,077, which is a continuation of application No. 16/443,508, filed on Jun. 17, 2019, now Pat. No. 11,519,842, application No. 17/233,204 is a division of application No. 14/214,899, filed on Mar. 15, 2014, now Pat. No. 10,983,040, and a continuation of application No. 14/214,876, filed on Mar. 15, 2014, now Pat. No. 10,352,844.

(60) Provisional application No. 61/786,642, filed on Mar. 15, 2013, provisional application No. 61/786,616, filed on Mar. 15, 2013, provisional application No. 61/786,667, filed on Mar. 15, 2013.

(51) Int. Cl.
*G01N 15/10*   (2006.01)
*G06F 8/654*   (2018.01)
*G06F 9/4401*  (2018.01)

(52) U.S. Cl.
CPC .............. *G01N 15/10* (2013.01); *G06F 8/654* (2018.02); *G06F 9/4406* (2013.01)

(58) Field of Classification Search
CPC ........ G01N 15/10; G06F 9/4401; G06F 8/654
See application file for complete search history.

(56) References Cited

U.S. PATENT DOCUMENTS

| | | |
|---|---|---|
| 3,361,030 A | 1/1968 | Goldberg |
| 3,696,399 A | 10/1972 | Klein et al. |
| 3,710,933 A | 1/1973 | Fulwyler et al. |
| 3,919,050 A | 11/1975 | Curby |
| 3,941,982 A | 3/1976 | Knollenberg et al. |
| 4,011,459 A | 3/1977 | Knollenberg et al. |

(Continued)

FOREIGN PATENT DOCUMENTS

| | | |
|---|---|---|
| CN | 100478670 C | 4/2009 |
| CN | 202720173 U | 2/2013 |

(Continued)

OTHER PUBLICATIONS

Alphasense Ltd., Alphasense User Manual OPC-N2 Optical Particle Counter. www.alphasense.com. 072-0300, Issue 3, 15 pages, Apr. 2015.

(Continued)

*Primary Examiner* — Mark A Connolly
(74) *Attorney, Agent, or Firm* — McCarter & English, LLP; Thomas O. Hoover

(57) ABSTRACT

An airborne or liquid particle sensor with integrated bootloader. A particle sensor incorporating at least one bootloader for programming or retrieval of program or data in local memory.

20 Claims, 2 Drawing Sheets

(56) References Cited

U.S. PATENT DOCUMENTS

| | | |
|---|---|---|
| 4,153,541 A | 5/1979 | Rumpf et al. |
| 4,232,967 A | 11/1980 | Grachev et al. |
| 4,276,472 A | 6/1981 | Costantino et al. |
| 4,361,403 A | 11/1982 | Loos |
| 4,383,917 A | 5/1983 | Wells |
| 4,506,678 A | 3/1985 | Russell et al. |
| 4,571,079 A | 2/1986 | Knollenberg |
| 4,594,715 A | 6/1986 | Knollenberg |
| 4,607,228 A | 8/1986 | Reif |
| 4,636,075 A | 1/1987 | Knollenberg |
| 4,728,190 A | 3/1988 | Knollenberg |
| 4,740,988 A | 4/1988 | Knollenberg et al. |
| 4,798,465 A | 1/1989 | Knollenberg |
| 4,832,011 A | 5/1989 | Busch |
| 4,872,972 A | 10/1989 | Wakabayashi et al. |
| 4,893,928 A | 1/1990 | Knollenberg |
| 4,893,932 A | 1/1990 | Knollenberg |
| 4,928,153 A | 5/1990 | Glass |
| 4,984,889 A | 1/1991 | Sommer |
| 4,999,498 A | 3/1991 | Hunt et al. |
| 5,000,052 A | 3/1991 | Sipin |
| 5,001,463 A | 3/1991 | Hamburger |
| 5,059,395 A | 10/1991 | Brittenham et al. |
| 5,093,571 A | 3/1992 | Inomata et al. |
| 5,096,474 A | 3/1992 | Miller, Jr. et al. |
| 5,235,625 A | 8/1993 | Stolz et al. |
| 5,257,087 A | 10/1993 | Furuya |
| 5,269,659 A | 12/1993 | Hampton et al. |
| 5,282,151 A | 1/1994 | Knollenberg |
| 5,317,930 A | 6/1994 | Wedding |
| 5,410,403 A | 4/1995 | Wells |
| 5,426,501 A | 6/1995 | Hokanson et al. |
| 5,428,964 A | 7/1995 | Lobdell |
| 5,467,189 A | 11/1995 | Kreikbaum et al. |
| 5,493,123 A | 2/1996 | Knollenberg et al. |
| 5,498,273 A | 3/1996 | Mann |
| 5,515,164 A | 5/1996 | Kreikbaum et al. |
| 5,553,507 A | 9/1996 | Basch et al. |
| 5,553,795 A | 9/1996 | Tsai et al. |
| 5,600,438 A | 2/1997 | Kreikbaum et al. |
| 5,671,046 A | 9/1997 | Knowlton |
| 5,751,422 A | 5/1998 | Mitchell |
| 5,805,281 A | 9/1998 | Knowlton |
| 5,825,487 A | 10/1998 | Felbinger et al. |
| 5,861,950 A | 1/1999 | Knowlton |
| 5,903,338 A | 5/1999 | Mavliev et al. |
| 5,946,091 A | 8/1999 | Yufa |
| 5,961,291 A | 10/1999 | Sakagami et al. |
| 6,016,194 A | 1/2000 | Girvin et al. |
| 6,031,610 A | 2/2000 | Adams |
| 6,035,551 A | 3/2000 | Scheufler et al. |
| 6,061,132 A | 5/2000 | Girvin et al. |
| 6,091,502 A | 7/2000 | Weigl et al. |
| 6,111,642 A | 8/2000 | DeFreez et al. |
| 6,137,572 A | 10/2000 | DeFreez et al. |
| 6,167,107 A | 12/2000 | Bates |
| 6,246,474 B1 | 6/2001 | Cerni et al. |
| 6,275,290 B1 | 8/2001 | Cerni et al. |
| 6,284,025 B1 | 9/2001 | Kreisberg et al. |
| 6,327,918 B1 | 12/2001 | Lawless |
| 6,386,015 B1 | 5/2002 | Rader et al. |
| 6,398,118 B1 | 6/2002 | Rosen et al. |
| 6,508,631 B1 | 1/2003 | Smith et al. |
| 6,592,822 B1 | 7/2003 | Chandler |
| 6,615,679 B1 | 9/2003 | Knollenberg et al. |
| 6,705,844 B2 | 3/2004 | Englander |
| 6,709,311 B2 | 3/2004 | Cerni |
| 6,788,152 B2 | 9/2004 | Nishizono |
| 6,859,277 B2 | 2/2005 | Wagner et al. |
| 6,900,439 B2 | 5/2005 | Komiyama et al. |
| 6,903,818 B2 | 6/2005 | Cerni et al. |
| 6,945,090 B2 | 9/2005 | Rodier |
| 6,988,671 B2 | 1/2006 | DeLuca |
| 7,011,491 B2 | 3/2006 | Englander |
| 7,030,980 B1 | 4/2006 | Sehler et al. |
| 7,058,477 B1 | 6/2006 | Rosen |
| 7,088,446 B2 | 8/2006 | Cerni |
| 7,088,447 B1 | 8/2006 | Bates et al. |
| 7,150,408 B2 | 12/2006 | DeLuca |
| 7,208,123 B2 | 4/2007 | Knollenberg et al. |
| 7,235,214 B2 | 6/2007 | Rodier et al. |
| RE39,783 E | 8/2007 | Cerni et al. |
| 7,343,751 B2 | 3/2008 | Kates |
| 7,439,855 B1 | 10/2008 | Yufa |
| 7,456,960 B2 | 11/2008 | Cerni et al. |
| 7,457,709 B2 | 11/2008 | Zhang et al. |
| 7,473,216 B2 | 1/2009 | Lolachi et al. |
| 7,521,682 B1 | 4/2009 | Holland et al. |
| 7,576,857 B2 | 8/2009 | Wagner |
| 7,598,878 B2 | 10/2009 | Goldreich |
| 7,604,676 B2 | 10/2009 | Braziunas |
| 7,616,126 B2 | 11/2009 | Kadwell et al. |
| 7,667,839 B2 | 2/2010 | Bates |
| 7,724,150 B2 | 5/2010 | Chandler et al. |
| 7,724,368 B2 | 5/2010 | Ahn |
| 7,796,255 B2 | 9/2010 | Miller |
| 7,799,567 B1 | 9/2010 | Call |
| 7,831,801 B1 | 11/2010 | Anderson |
| 7,867,779 B2 | 1/2011 | McDermott et al. |
| 7,895,000 B2 | 2/2011 | Chandler et al. |
| 7,916,293 B2 | 3/2011 | Mitchell et al. |
| 7,932,490 B2 | 4/2011 | Wang et al. |
| 7,973,929 B2 | 7/2011 | Bates |
| 7,985,949 B2 | 7/2011 | Rodier |
| 8,009,290 B2 | 8/2011 | Unger |
| 8,027,035 B2 | 9/2011 | Mitchell et al. |
| 8,047,055 B2 | 11/2011 | Wang et al. |
| 8,146,376 B1 | 4/2012 | Williams et al. |
| 8,154,724 B2 | 4/2012 | Mitchell et al. |
| 8,174,697 B2 | 5/2012 | Mitchell et al. |
| 8,219,249 B2 | 7/2012 | Harrod et al. |
| 8,415,635 B2 | 4/2013 | Marks et al. |
| 8,424,397 B2 | 4/2013 | Fjerdingstad |
| 8,427,642 B2 | 4/2013 | Mitchell et al. |
| 8,534,116 B2 | 9/2013 | Wang et al. |
| 8,708,708 B1 | 4/2014 | Carideo et al. |
| 8,800,383 B2 | 8/2014 | Bates |
| 9,070,272 B2 | 6/2015 | Gettings et al. |
| 9,116,121 B2 | 8/2015 | Kaye et al. |
| 9,140,638 B2 | 9/2015 | Pariseau et al. |
| 9,140,639 B2 | 9/2015 | Pariseau |
| 9,141,094 B2 | 9/2015 | Pariseau et al. |
| 9,157,847 B2 | 10/2015 | Pariseau et al. |
| 9,158,652 B2 | 10/2015 | Pariseau |
| 9,170,180 B2 | 10/2015 | Shinohara et al. |
| 9,261,287 B2 | 2/2016 | Warren et al. |
| 9,335,244 B2 | 5/2016 | Han |
| 9,470,627 B2 | 10/2016 | Alexander et al. |
| 9,541,475 B2 | 1/2017 | Chu et al. |
| 9,677,990 B2 | 6/2017 | Pariseau et al. |
| 9,726,579 B2 | 8/2017 | Han et al. |
| 10,041,862 B2 | 8/2018 | Han et al. |
| 10,054,534 B1 | 8/2018 | Nourbakhsh et al. |
| 10,229,563 B2 | 3/2019 | Salton et al. |
| 10,352,844 B2 | 7/2019 | Pariseau |
| 10,365,197 B2 | 7/2019 | Jongerius et al. |
| 10,718,703 B2 | 7/2020 | Pariseau et al. |
| 10,983,040 B2 | 4/2021 | Pariseau |
| 11,169,077 B2 | 11/2021 | Pariseau et al. |
| 11,579,072 B2 | 2/2023 | Pariseau et al. |
| 2002/0083780 A1 | 7/2002 | Lutz et al. |
| 2002/0135764 A1 | 9/2002 | Oka et al. |
| 2003/0009334 A1 | 1/2003 | Printz et al. |
| 2003/0051023 A1 | 3/2003 | Reichel et al. |
| 2003/0078751 A1 | 4/2003 | Juhasz |
| 2003/0105546 A1 | 6/2003 | Robinson et al. |
| 2004/0068359 A1 | 4/2004 | Neiss et al. |
| 2004/0068389 A1 | 4/2004 | Kleefstra |
| 2004/0222307 A1 | 11/2004 | DeLuca |
| 2004/0260702 A1 | 12/2004 | Cragun et al. |
| 2005/0028593 A1 | 2/2005 | Rodier |
| 2005/0043926 A1 | 2/2005 | Hayzen et al. |
| 2005/0100181 A1 | 5/2005 | Croft et al. |
| 2005/0161517 A1 | 7/2005 | Helt et al. |

(56) References Cited

U.S. PATENT DOCUMENTS

| | | |
|---|---|---|
| 2005/0270151 A1 | 12/2005 | Winick |
| 2006/0038998 A1 | 2/2006 | Wagner |
| 2006/0049815 A1 | 3/2006 | Ho et al. |
| 2006/0071803 A1* | 4/2006 | Hamburger .......... G01N 1/2202 702/29 |
| 2006/0234621 A1 | 10/2006 | Desrochers et al. |
| 2007/0048863 A1 | 3/2007 | Rodgers et al. |
| 2007/0092976 A1 | 4/2007 | Watson et al. |
| 2007/0147702 A1 | 6/2007 | Scoullar et al. |
| 2007/0159156 A1 | 7/2007 | Hu et al. |
| 2007/0178529 A1 | 8/2007 | Breidford et al. |
| 2007/0229825 A1 | 10/2007 | Bates |
| 2008/0057931 A1 | 3/2008 | Nass et al. |
| 2008/0146890 A1 | 6/2008 | LeBoeuf et al. |
| 2008/0182506 A1 | 7/2008 | Jackson et al. |
| 2008/0215345 A1 | 9/2008 | Hollingsworth et al. |
| 2008/0221812 A1 | 9/2008 | Pittaro et al. |
| 2008/0246963 A1 | 10/2008 | Nakajima |
| 2009/0050538 A1 | 2/2009 | Lean et al. |
| 2009/0128810 A1 | 5/2009 | Bates |
| 2009/0190128 A1 | 7/2009 | Cerni et al. |
| 2009/0237659 A1 | 9/2009 | Miers |
| 2009/0242799 A1 | 10/2009 | Bolotin et al. |
| 2009/0259709 A1 | 10/2009 | Nikitin |
| 2009/0268202 A1 | 10/2009 | Wagner |
| 2009/0283456 A1 | 11/2009 | Le Vot et al. |
| 2010/0212670 A1 | 8/2010 | Amighi et al. |
| 2010/0225913 A1 | 9/2010 | Trainer |
| 2010/0253509 A1 | 10/2010 | Fu et al. |
| 2010/0264301 A1 | 10/2010 | Borosak |
| 2010/0282260 A1 | 11/2010 | Sung |
| 2011/0175661 A1 | 7/2011 | Quesada et al. |
| 2011/0277679 A1 | 11/2011 | Good et al. |
| 2011/0303859 A1 | 12/2011 | Lofstrom et al. |
| 2012/0012744 A1 | 1/2012 | Wang et al. |
| 2012/0085831 A1 | 4/2012 | Kopp |
| 2012/0140231 A1 | 6/2012 | Knox et al. |
| 2012/0295301 A1 | 11/2012 | Miyashita et al. |
| 2013/0040857 A1 | 2/2013 | Anderson |
| 2013/0166251 A1 | 6/2013 | Latimer et al. |
| 2013/0270287 A1 | 10/2013 | Guo et al. |
| 2013/0286392 A1 | 10/2013 | Erdtmann |
| 2013/0295588 A1 | 11/2013 | Watkins et al. |
| 2014/0022547 A1 | 1/2014 | Knox et al. |
| 2014/0053586 A1 | 2/2014 | Poecher et al. |
| 2014/0134608 A1 | 5/2014 | Hanashi et al. |
| 2014/0281659 A1 | 9/2014 | Pariseau |
| 2014/0354976 A1 | 12/2014 | Evenstad et al. |
| 2015/0063982 A1 | 3/2015 | Pariseau et al. |
| 2015/0200083 A1 | 7/2015 | Brown et al. |
| 2015/0316463 A1 | 11/2015 | Pariseau et al. |
| 2015/0323941 A1 | 11/2015 | Pariseau et al. |
| 2016/0000358 A1 | 1/2016 | Lundin et al. |
| 2016/0067531 A1 | 3/2016 | Pariseau et al. |
| 2017/0241893 A1 | 8/2017 | Walls et al. |
| 2017/0336312 A1 | 11/2017 | Stoeber et al. |
| 2019/0195765 A1 | 6/2019 | Chen et al. |
| 2019/0301998 A1 | 10/2019 | Pariseau |
| 2020/0011779 A1 | 1/2020 | Lavrovsky et al. |
| 2020/0371015 A1 | 11/2020 | Pariseau et al. |
| 2020/0378940 A1 | 12/2020 | Pariseau |
| 2021/0025805 A1 | 1/2021 | Pariseau et al. |
| 2021/0025806 A1 | 1/2021 | Pariseau et al. |
| 2021/0025807 A1 | 1/2021 | Pariseau et al. |
| 2021/0063299 A1 | 3/2021 | Pariseau et al. |
| 2021/0088437 A1 | 3/2021 | Pariseau et al. |
| 2021/0349006 A9 | 11/2021 | Pariseau |
| 2022/0003654 A1 | 1/2022 | Pariseau et al. |
| 2023/0304914 A1 | 9/2023 | Pariseau et al. |
| 2023/0400403 A1 | 12/2023 | Pariseau et al. |

FOREIGN PATENT DOCUMENTS

| | | | | |
|---|---|---|---|---|
| GB | 674265 A | 6/1952 | | |
| GB | 2420616 A | 5/2006 | | |
| GB | 2474235 A | 4/2011 | | |
| JP | 56-39420 A | 4/1981 | | |
| JP | 3-296622 A | 12/1991 | | |
| JP | 5005704 B2 * | 8/2012 | ............ | G01N 15/12 |
| WO | WO-1994/29716 A1 | 12/1994 | | |
| WO | WO-1998/56426 A1 | 12/1998 | | |
| WO | WO-1999/22219 A1 | 5/1999 | | |
| WO | WO-1999/56106 A1 | 11/1999 | | |
| WO | WO-2001/06333 A2 | 1/2001 | | |
| WO | WO-2001/63250 A1 | 8/2001 | | |
| WO | WO-2002/063294 A2 | 8/2002 | | |
| WO | WO-2004/010113 A1 | 1/2004 | | |
| WO | WO-2007/126681 A1 | 11/2007 | | |
| WO | WO-2008/140816 A1 | 11/2008 | | |
| WO | WO-2009/073649 A1 | 6/2009 | | |
| WO | WO-2009/073652 A1 | 6/2009 | | |
| WO | WO-2011/025763 A1 | 3/2011 | | |
| WO | WO-2012/055048 A1 | 5/2012 | | |
| WO | WO-2012/064878 A2 | 5/2012 | | |
| WO | WO-2013/017832 A1 | 2/2013 | | |
| WO | WO-2014/043413 A1 | 3/2014 | | |
| WO | WO-2016/065465 A1 | 5/2016 | | |
| WO | WO-2017/054098 A1 | 4/2017 | | |

OTHER PUBLICATIONS

Bauer et al., Monitoring personal fine particle exposure with a particle counter. J Expo Anal Environ Epidemiol. May-Jun. 1999;9(3):228-36.

Bell et al., Reassessment of the lethal London fog of 1952: novel indicators of acute and chronic consequences of acute exposure to air pollution. Environ Health Perspect. Jun. 2001; 109(Suppl 3):389-94.

Chua et al., Electrical Mobility Separation of Airborne Particles Using Integrated Microfabricated Corona ionizer and Separator Electrodes. Journal of Microelectromechanical Systems. Feb. 2009;18(1):4-13.

Chung et al., Comparison of real-time instruments used to monitor airborne particulate matter. J Air Waste Manag Assoc. Jan. 2001;51(1):109-20.

Dylos Corporation, DC1100 Air Quality Monitor. User Manual. 19 pages, (2008).

Esmen et al., Theoretical Investigation of the Interrelationship Between Stationary and Personal Sampling in Exposure Estimation. Applied Occupational and Environmental Hygiene. Nov. 30, 2010;15(1):114-119.

Fluke, 985, Airborne Particle Counter, Users Manual, 32 pages, Mar. 2012.

Freescale Semiconductor, Inc., Data Sheet: Technical Data: High Temperature Accuracy Integrated Silicon Pressure Sensor for Measuring Absolute Pressure, On-Chip Signal Conditioned, Temperature Compensated and Calibrated. Document No. MP3H6115A, Rev 5.1, 13 pages, May 2012.

Freescale Semiconductor, Inc., Integrated Silicon Pressure Sensor On-Chip Conditioned Temperature Compensated and Calibrated. MPXV5004G, Rev 12, 22 pages, Sep. 2009.

Giorio et al., Field comparison of a personal cascade impactor sampler, an optical particle counter and CEN-EU standard methods for PM10, PM2.5 and PM1 measurement in urban environment. Journal of Aerosol Science. 2013;65:111-120.

Hach, Met One 7000: 7005, 7015, Doc026.53.80360, Edition 1. User Manual. 32 pages, Jul. 2013.

Howard-Reed et al., Use of a continuous nephelometer to measure personal exposure to particles during the U.S. Environmental Protection Agency Baltimore and Fresno Panel studies. J Air Waste Manag Assoc. Jul. 2000;50(7):1125-32.

Li et al., On the Feasibility of a Numbe Concentration Calibration Using a Wafer Surface Scanner. Aerosol Science and Technology. 2014;48:747-57.

(56) References Cited

OTHER PUBLICATIONS

Particles Plus, 8306 Handheld Airborne Particle Counter. Retrieved online at: https://www.emlab.com/m/store/Particles%20Plus%208306Handheld%20Particle%20Counter%20Spec%20Sheet.pdf. 2 pages, (2019).
Pope et al., Lung cancer, cardiopulmonary mortality, and long-term exposure to fine particulate air pollution. JAMA. Mar. 6, 2002;287(9):1132-41.
RTI International, MicroPEM™—PM2.5 Personal Exposure Monitor. www.rti.org, 2 pages.
Schaap et al., Continuous Size-Separation of Airborne Particles in a Microchannel for Aerosol Monitoring. IEEE Sensors Journal. Nov. 2011;11(11):2790-7.
Schaap et al., Transport of airborne particles in straight and curved microchannels. Physics of Fluids. 2012;24(8):083301, 14 pages.
Sharp, GP2Y1010AUOF, Compact Optical Dust Sensor. Sharp Corporation. Data Sheet, 9 pages, Dec. 1, 2006.
Thermo Electron Corporation, Models: PDR-1000AN & PDR-1200S, Personal Dataram Particulate Monitoring, Instruction Manual. www.thermo.com/ih. 54 pages, Jan. 2004.
Thermo Scientific, MIE pDR-1500. Instruction Manual, Active Personal Particulate Monitor, Part No. 105983-00. Thermo Fisher Scientific, Inc. 112 pages, Jan. 31, 2014.
Thermo Scientific, Model pDR-AN/1200, personalDATARAM Instruction Manual. Particulate Monitor, Part No. 100181-00. Thermo Fisher Scientific, Inc. 56 pages, May 15, 2013.
TSI Incorporated, TSI Aerotrak Portable Particle Counter Model 9110, Application Note CC-107. Retrieved online at: https://www.tsi.com/getmedia/f7a6a0a2-cb7d-4c25-9674-b920b77d5835/AeroTrak_Portable_Particle_Counter_9110_A4_CC-107?ext =. pdf. 9 pages, (2013).
TSI, Aerosol Instrument Manager Software for Scanner Mobility Particle Sizer (SMPS) Spectrometer. User's Manual. P/N 1930038, Revision H. 119 pages, Apr. 2010.
TSI, AeroTrak Handheld Airborne Particle Counter, Model 9306, Operation Manual. P/N 6004215, Revision C. 81 pages, Feb. 2011.
TSI, AeroTrak Portable Airborne Particle Counter, Model 9110, Operation Manual, P/N 6004345, Revision A. 93 pages, Jul. 2010.
TSI, Model 3330 Optical Particle Sizer Spectrometer, Operation and Service Manual. P/N 6004403, Revision C. 114 pages, Jan. 2011.
TSI, Optical Particle Sizer, Model 3330, Specifications. 4 pages, (2010).
TSI, SidepakTM Personal Aerosol Monitor, Model AM510, User Guide. TSI Incorporated, 74 pages, (2012).
Walton et al., Aerosol Instrumentation in Occupational Hygiene: An Historical Perspective. Aerosol Science and Technology. 1998;28(5):417-38.
Wikipedia, peer-to peer. Retrieved online at: https://web.archive.org/web/20161228184346/https://en.wikipedia.org/wiki/Peer-to-peer. 9 pages, Dec. 4, 2016.

\* cited by examiner

PARTICLE COUNTER WITH INTEGRATED BOOTLOADER

RELATED APPLICATIONS

This application is a divisional of, and claims priority to, U.S. patent application Ser. No. 14/214,899, now U.S. Pat. No. 10,983,040, filed on Mar. 15, 2014, titled PARTICLE COUNTER WITH INTEGRATED BOOTLOADER, which claimed priority to U.S. Provisional Application Ser. No. 61/786,616 and U.S. Provisional Application 61/786,667, both filed Mar. 15, 2013, and this application further claims priority to U.S. patent application Ser. No. 16/537,492, titled PERSONAL AIR QUALITY MONITORING SYSTEM, filed Aug. 9, 2019, the entire disclosures of all of the aforementioned applications being incorporated herein by reference in their entirety.

This application is related to and incorporates by reference U.S. Non-Provisional application Ser. No. 14/214,870, filed herewith on Mar. 15, 2014, titled PERSONAL AIR QUALITY MONITORING SYSTEM by inventors David Pariseau and Adam Giandomenico now U.S. Pat. No. 9,141,094; U.S. Non-Provisional application Ser. No. 14/214,903, filed herewith on Mar. 15, 2014, titled MIXED-MODE PHOTO-AMPLIFIER FOR PARTICLE COUNTER by inventors David Pariseau and Ivan Horban now U.S. Pat. No. 9,157,847; U.S. Non-Provisional application Ser. No. 14/214,876, filed herewith on Mar. 15, 2014, titled MULTIPLE PARTICLE SENSORS IN A PARTICLE COUNTER by inventor David Pariseau; U.S. Non-Provisional application Ser. No. 14/214,889, filed herewith on Mar. 15, 2014, titled INTELLIGENT MODULES IN A PARTICLE COUNTER by inventor David Pariseau; U.S. Non-Provisional application Ser. No. 14/214,895, filed herewith on Mar. 15, 2014, titled PULSE SCOPE FOR PARTICLE COUNTER by inventor David Pariseau; and U.S. Non-Provisional application Ser. No. 14/214,907, filed herewith on Mar. 15, 2014, titled PULSE DISCRIMINATOR FOR PARTICLE COUNTER by inventors David Pariseau and Ivan Horban.

BACKGROUND

Bootloaders have been in use in some products for some time. Typically these products are high-volume devices with applications that change substantially over time (products like routers, media players, set-top boxes, etc.). Instrumentation on the other hand typically has made do with a largely static code-base that is updated only rarely, and if so, by a dedicated programming channel (JTAG, controller programming pins, etc.). Typically this also requires dedicated hardware (JTAG programmer, device programmer etc.), which typically restricts use of such an interface to factory or service center upgrades.

Therefore, what is needed is a system and method for updating code-base of a device, including devices that uses instrumentation to advance in the art to improve updating of code-base of a device.

SUMMARY

In accordance with various aspects and embodiments of the present invention, a system and method are disclosed for updating code-base of a device.

BRIEF DESCRIPTION OF THE DRAWINGS

The foregoing summary as well as the following detailed description is better understood when read in conjunction with the appended drawings. For the purpose of illustrating the invention, there is shown in the drawings exemplary constructions of the invention; however, the invention is not limited to the specific various aspects, embodiments, methods and instrumentalities disclosed in the drawings.

DETAILED DESCRIPTION

Figure 1:
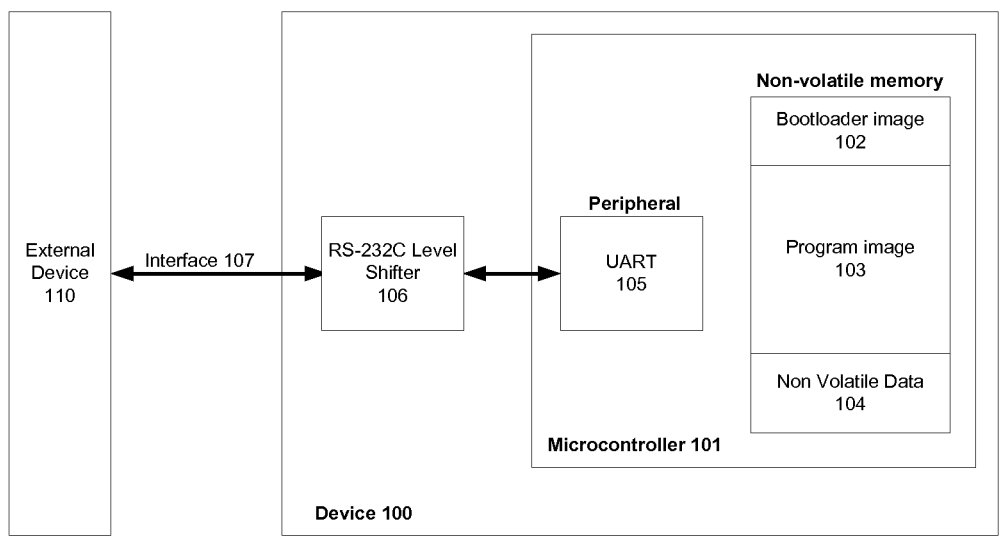
FIG. 1 shows a device in communication with a second device using an interface in accordance with the various aspects of the present invention.

It is noted that, as used in this description, the singular forms "a," "an" and "the" include plural referents unless the context clearly dictates otherwise. Reference throughout this specification to "one aspect," "another aspect," "at least one aspect," "various aspects," "one embodiment," "an embodiment," "certain embodiments," or similar language means that a particular aspect, feature, structure, or characteristic described in connection with the embodiment or embodiments is included in at least one aspect or embodiment of the present invention. Thus, appearances of the phrases "in accordance with one aspect," "in accordance with various aspects," "in accordance another aspect," "one embodiment," "in at least one embodiment," "in an embodiment," "in certain embodiments," and similar language throughout this specification may, but do not necessarily, all refer to the same embodiment.

In accordance with the various aspects of the present invention, a device includes a computing device. As referred to herein, the devices may be part of a system or the system. It may be implemented to include a central processing unit (e.g., a processor), memory, input devices (e.g., keyboard and pointing devices), output devices (e.g., display devices), and storage device (e.g., disk drives). The memory and storage device are computer-readable media that may contain instructions or code that, when executed by the processor or the central processing unit, cause the device to perform certain tasks. In addition, data structures and message structures may be stored or transmitted via a data transmission medium, such as a signal on a communications link. Various communications channels may be used (e.g., the Internet, a local area network (LAN), a wide area network (WAN), or a point-to-point dial-up connection, or any other wireless channel or protocol) to create a link.

In accordance with the various aspects of the present invention, the device or system may be use various computing systems or devices including personal computers, server computers, hand-held or laptop devices, multiprocessor systems, microprocessor based systems, programmable consumer electronics, network personal computers (PCs), minicomputers, mainframe computers, distributed computing environments that include any of the above systems or devices, and the like. In accordance with the various aspects of the present invention, the device or system may also provide its services to various computing systems such as personal computers, cell phones, personal digital assistants, consumer electronics, home automation devices, and so on.

In accordance with the various aspects of the present invention, the device or system may be described in the general context of computer-executable instructions, such as program modules or code, which is executed by one or more computers or devices. Generally, program modules include routines, programs, objects, components, data structures, and so on that perform particular tasks or implement particular data types. Typically, the functionality of the program modules may be combined or distributed as desired in various embodiments. For example, a user interface may be implemented on a server separate from a device or computer system that generates the data or information or collects the same through a communication channel.

There is an opportunity to make use of existing communications channels to provide a bootloader interface in instruments where this does not currently occur. More than simply adding a bootloader to a product that currently doesn't support one, the intent is to use this interface to leverage a host of services and provide a different business model for the sale, service and support of these instruments.

A bootloader provides the means of updating the codebase within a device. The bootloader shares an existing communication channel to provide this functionality and implements this functionality as part of the existing communications protocol or via some different or custom protocol. For example, one such bootloader is the asynchronous serial bootloader for a single microcontroller.

Referring now to FIG. 1, a device 100 includes a microcontroller 101 that includes an interfaces 107 to an external device 110 via a microcontroller 101's UART 105 and a level shifter 106 to provide an RS-232C type interface 107. In accordance with one aspect of the present invention, the interface 107 is used to collect data from the device 100 to log, display or analyze remotely, perhaps on a personal computer. In accordance with another aspect of the present invention, the interface 107 is used to update the non-volatile memory image in the device 100. The non-volatile memory includes bootloader image or code 102, program image 103, and non-volatile data 104. Bootloader code 102 resides in program memory is invoked by sending a particular command over interface 107, or sending a command at a particular time when the bootloader is active (for example immediately after power is cycled on the device 100, or when a recessed button is pressed, or the like).

After the bootloader code 102 is activated, the external device 110 sends at least one of the new program image 103, or non-volatile data 104, which might comprise operating parameters, tables, etc., to the device 100. In accordance with various aspects of the present invention, the bootloader allows writing of at least one program image. This allows the device 100's internal firmware to be updated without accessing the device 100's internals or providing a dedicated external programming interface. In accordance with at least one aspect of the present invention, external interface 107 is a network cable connected to a router or a wireless communication device (not shown) that is in communication with an external device, which could reside anywhere in the world and linked over a broadband network to the device 100 through the router.

Figure 2:
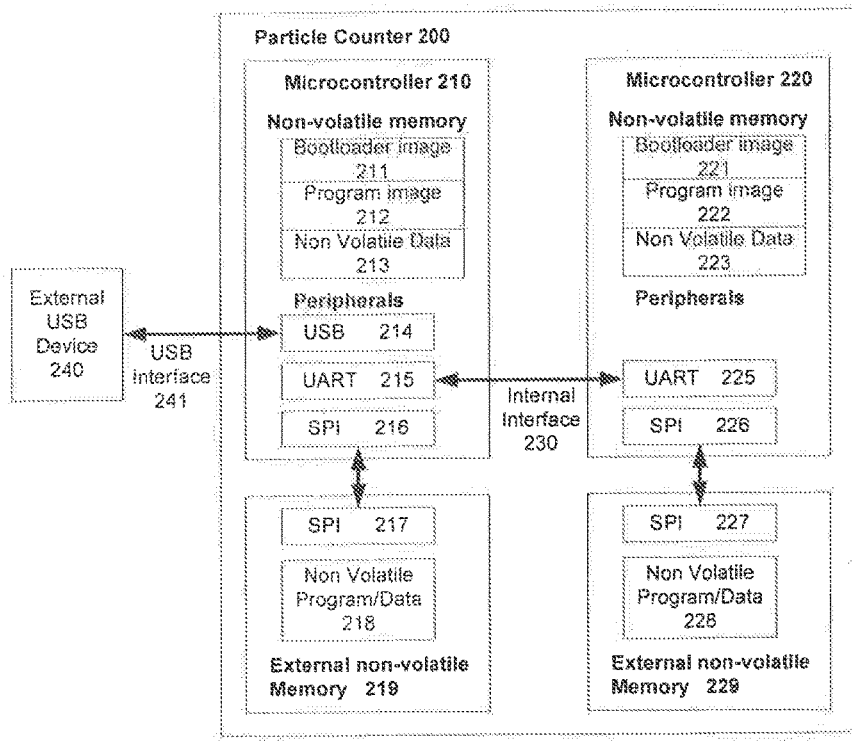
FIG. 2 shows a device in communication with a second device in accordance with the various aspects of the present invention.

In accordance with some aspects of the present and certain embodiments, FIG. 2 shows a particle counter 200 (also referred to as "particle counter system") that includes at least one particle sensor, two microcontrollers 210 and 220, two external non-volatile memories 219 and 229, and at least one external communication interface 241. The particle counter 200 interfaces to an external device 240 over the interface 241. During typical operation the interface 241 is used to retrieve logged data from the particle counter 200 to display, log or analyze at, for example, the external device 240. In accordance with one aspect of the present invention, the interface 241 is a wireless connection (not shown). In accordance with a further aspect of the present invention, the interface 241 is a wired connection, such as a USB.

In accordance with one aspect, the interface 241 is a link that is also used to read and/or write to the microcontroller non-volatile memories 212, 213, 222, 223 and/or the external non-volatile memories 218 and 228. In order to do so bootloader mode would be initiated on the particle counter 200. For example, a special command (or command sequence) is sent over the USB interface 241 to the microcontroller 210. On receiving this command, or these commands, the microcontroller 210 implements the USB interface 241. The microcontroller 210 alerts the microcontroller 220, to which it is communicatively coupled to, over an internal link 230 as to the request for a bootload session. Accordingly, both microcontrollers 210 and 220 enter bootload mode.

In this mode the microcontroller 210, implementing the interface 241 receives commands from the device 240 requesting read/write operations to the various non-volatile memory areas 212, 213, 218, 222, 223, and 228. The microcontroller 210 directly implements any such operations to its internal memory areas 212 and 213 or to its external memory device 218 and responds with status and/or data over the interface 241. The microcontroller 210 passes any requests for access to the memory areas for the microcontroller 220 over the internal link 230. That microcontroller 220 implements access to these areas and responds over the internal link 230 with the status and/or data for such accesses. The microcontroller 210 relays any such responses and/or data over the external link 241. Here, the external device 240 reads/writes the various non-volatile memory areas within the particle counter 200.

In accordance with other aspects and embodiments, there are more or fewer microcontrollers in the particle counter 200 and some or all of the application use soft-processors on programmable logic, or via custom ASICs.

In certain embodiments, the bootloader is implemented such that the data communicated (e.g., read/written) to the various memory areas is encrypted, to protect valuable intellectual property from the original equipment manufacturer.

After the above a bootloader has been implemented in a particle counting instrument, such as to allow non-volatile memory areas to be read and/or written from an external interface, a variety of business processes are enabled. These include but are not limited to the following:

Sale of various instrument firmware options. In accordance with various aspects, a base unit can be sold to a client with firmware options available for purchase at some later date. The client can purchase these when they need the functionality offered by a particular option, and the update can be downloaded to the unit or device via a remote interface (online image), so that the unit or device can be upgraded without having to be shipped to a service center. This allows a client to buy just the instrument they need today with the confidence that this unit can grow as they require over time, without investing in possible future options at the time of purchase.

Firmware subscription service. In accordance with various aspects, in addition to selling a base instrument a company can now sell a subscription service for that instrument (like is currently done for many engineering software products). The client would purchase an annual subscription for the product, which would entitle them to all upgrades that were created for their product over that period. The unit might download such updates (on request or automatically)

when connected to a local computer. In accordance with various aspects and embodiments, the unit or device has wireless interfaces installed and update automatically or in accordance with defined rules for updating.

Remote diagnostics and troubleshooting. In accordance with some aspects, diagnostics or troubleshooting of complex errors or issues in the field is complicated given the firmware image installed in an instrument or device. The ability for service personnel to be able to upload the current image in the instrument, download diagnostic firmware to the instrument to run a more in-depth or targeted analysis of the subsystem in question, and then replace the original image as needed, might provide for a more timely and cost-effective resolution of a customer issue that might not result in the unit being returned to the factory or a service center for resolution.

Assisted calibration and service. In accordance with some aspects, an instrument or a device needs calibration. In many cases service centers that offer calibration services do so without the involvement of the original equipment manufacturer (OEM), which can reduce the quality or repeatability of the calibration. It also means that the OEM cannot analyze the instrument in question for failures and issues within it, to date. Having an online bootloader allows a service center to download, from the OEM for each instrument, the calibration image. This would allow the OEM to do the following:

retrieve statistical data from every instrument on each calibration cycle;
this would allow issues to be identified and flagged for this instrument;
this would allow issues for a product family to be identified or flagged;
this would provide valuable data for future products;
have more control over the quality and consistency of calibration operations; and allow end-users (with suitable equipment) to calibrate their instruments themselves.

Application customization. In accordance with various aspects, an interface that allows access to an instrument's memories allows for user-customization. Sophisticated user-interfaces might be customized to include facility maps, complex recipes, etc. that could be created on a personal computer or imported from pre-generated drawings and then downloaded to on-board memories. In accordance with various aspects, if the on-board instrument programming is done as an API, then the user could redesign the look-and-feel of the system and provide for a customized and highly tailored user interface designed to suit their particular needs.

In certain embodiments, an air quality monitoring system, such as a portable particle detection system, is worn or carried by a user to provide real-time monitoring of the air quality in their local environment.

Figure 3:
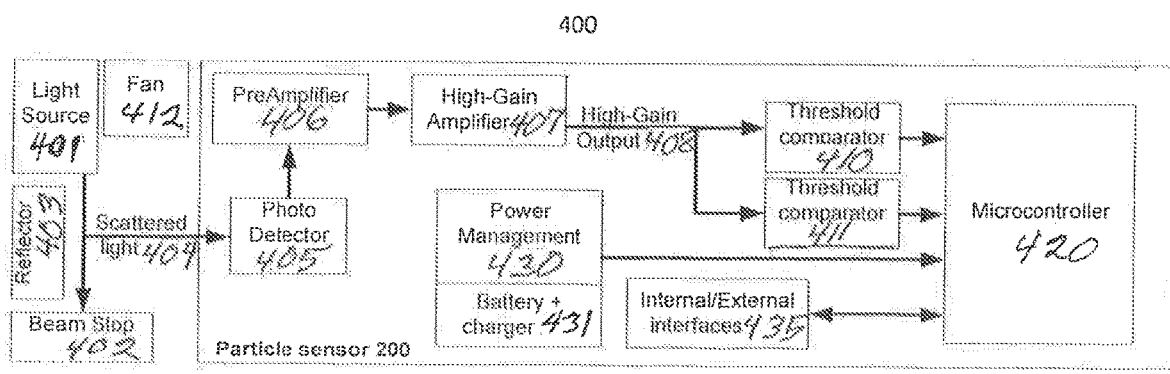
FIG. 3 shows a particle counter device in accordance with various aspects of the invention.

Referring now to FIG. 3, illustrated is an embodiment of an air quality monitoring system (400), also referred to as "personal particle counter" or "personal counter" or "personal counter device." Here, air is passed through a light beam generated by a light source (401) where particles scatter light (404). The airstream is generated by a fan or blower (412) or some other air impeller where air is drawn or pushed into the enclosure and is routed in such a way as to pass through the beam. In certain embodiments, the light source is a laser diode, a light-emitting-diode, or the equivalent. The light is focused by a lens to create a ribbon of light through which the airstream passes, in order to provide controlled scattering of light by particle size. In another implementation, a light blocking system is utilized, in which a beam is presented to a photo-diode and particles obscure the beam as they pass through it, thereby providing the signal.

In the case of a light-scattering system. Light scattered by particles in the stream (404) gets collected by a reflector (403) and presented to the photo-detector (405) and the resulting signal is amplified by the pre-amplifier stage (406), such as a trans-impedance amplifier. In some cases a second amplification (407) is utilized and the resulting electrical signal is used to drive one or more threshold comparators (410, 411). The outputs of the threshold comparators (410, 411) is used as inputs to counter channels within the microcontroller (420). These counts are used to determine the quality of the air. In this case there are two separate channels, which could be setup to different counts for particles of different sizes.

The air quality monitoring system (400) is powered locally by a battery (431), which is charged from some external power source. A large number of charging techniques are possible including, but not limited to: an external power connector, power from some external wired interface, wireless (inductive) charging, a solar cell, local charging from energy harvesting means. The battery power is managed locally via the Power Management circuit (430) that provided regulated power to the on-board circuitry (including the analog circuits (amplifiers, comparators, etc.)) and the digital circuitry (microcontroller, internal/external interfaces).

Here, the Internal/External user interfaces (435) is communicatively coupled to the threshold comparator. In certain embodiments, the Internal/External user interfaces (435) comprise one or more of these non-limiting features:

an on-board display, liquid-crystal-display (LCD) or other, to display current air quality status, air-quality over time, cumulative particulate mass, graphs, charts, etc. or other air quality,
an on-board memory (volatile or non-volatile) to store or log historic air quality data (for display use or later retrieval and reporting or analysis),
an on-board eccentric-rotating-mass (ERM) motor, to provide vibration to alert or interface with user,
an on-board audio transducer, to provide sound to alert or interface with user,
one or more push-buttons on-board, to interface with user,
an on-board wired interface channel for communication with external devices,
an on-board wired interface to allow the battery to be charged, and
an on-board wireless communications interface channel for communication with external devices.

The above gives a general overview of the invention with some of the interface options. In certain embodiments, the air quality monitoring system (400) is embodied in a carrying means that takes on the structure of any of a plurality of form-factors, not limited by the examples provided.

While various embodiments have been described above, it should be understood that they have been presented by way of example only, not limitation, and various changes in form and details may be made. Any portion of the device, instrument, apparatus and/or methods described herein may be combined in any combination, except mutually exclusive combinations. The aspects and embodiments described herein can include various combinations and/or sub-combinations of the functions, components and/or features of the different embodiments described. For example, multiple, distributed processing systems can be configured to operate in parallel.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

It will be apparent that various aspects of the present invention as related to certain embodiments may be implemented in software, hardware, application logic, or a combination of software, hardware, and application logic. The software, application logic and/or hardware may reside on a server, an electronic device, or be a service. If desired, part of the software, application logic and/or hardware may reside on an electronic device and part of the software, application logic and/or hardware may reside on a remote location, such as server.

In accordance with the aspects disclosed in the teachings of the present invention and certain embodiments, a program or code may be noted as running on a device, an instrument, a system, or a computing device, all of which are an article of manufacture. Additional examples of an article of manufacture include: a server, a mainframe computer, a mobile telephone, a multimedia-enabled smartphone, a tablet computer, a personal digital assistant, a personal computer, a laptop, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform tasks and methods. Furthermore, an article of manufacture (e.g., device) includes a non-transitory computer readable medium having a series of instructions, such as computer readable program steps or code, which is encoded therein. In certain aspects and embodiments, the non-transitory computer readable medium includes one or more data repositories, memory, and storage, including non-volatile memory. The non-transitory computer readable medium includes corresponding computer readable program or code and may include one or more data repositories. Processors access the computer readable program code encoded on the corresponding non-transitory computer readable mediums and execute one or more corresponding instructions. Other hardware and software components and structures are also contemplated.

Unless defined otherwise, all technical and scientific terms used herein have the same meaning as commonly understood by one of ordinary skill in the art to which this invention belongs. Although any methods and materials similar or equivalent to those described herein can also be used in the practice of the present invention, representative illustrative methods and materials are described herein.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

I claim:

1. A particle counter comprising:
   at least one processor having an operating mode for counting particles and a software update mode;
   at least one non-volatile memory that communicates with the at least one processor to store an updated software program code;
   at least one particle sensor that communicates with the at least one processor to detect particles, the at least one particle sensor including a battery, a light source, a light detector, and a plurality of particle counting channels for different particle sizes detected in an airflow;
   at least one external communication interface that communicates with the at least one processor;
   wherein the at least one external communication interface communicates with the particle counter to execute the software update mode to initiate a software update session such that an updated software code is written to the at least one non-volatile memory; and
   wherein the external communication interface is used to implement an updated particle counter user interface with the updated software code.

2. The particle counter of claim 1, wherein the at least one non-volatile memory can be read remotely with an external device using the at least one external communication interface.

3. The particle counter of claim 1, wherein data written or read from the at least one non-volatile memory is encrypted during transmission over the at least one external communication interface.

4. The particle counter of claim 1, wherein the at least one external communication interface is used to implement installation of post-purchase options.

5. The particle counter of claim 1, wherein the at least one external communication interface is used to implement a subscription service.

6. The particle counter of claim 1, wherein the at least one external communication interface is used to implement remote diagnostics.

7. The particle counter of claim 1, wherein the software update session further comprises updating a program configured to calibrate the at least one particle sensor.

8. The particle counter of claim 1, wherein the at least one external communication interface is used to implement a user-customization of the particle counter.

9. A battery powered particle counter comprising:
   a non-volatile memory within an enclosure of a battery powered particle counter to be carried by a user, the non-volatile memory being configured to store program code and configured to allow read/write operations from an external device;
   a particle sensor within the battery powered particle counter that counts particles, the particle sensor comprising a battery, a light source, a light detector and a particle counting microcontroller having inputs for a plurality of particle counting channels; and an interface microcontroller within the battery powered particle counter that communicates with the particle sensor and the non-volatile memory, the interface microcontroller being configured to receive at least one program image from an external device through a network communication interface, wherein the program image updates a stored program code.

10. The particle counter of claim 9, wherein the non-volatile memory is selected from the group including: a non-volatile memory internal to the interface microcontroller and a non-volatile memory external to the interface microcontroller.

11. The particle counter of claim 9, further comprising an internal interface microcontroller in communication with the internal microcontroller.

12. A method for updating a particle counter, the method comprising:

receiving from an external device, at a first microcontroller of a battery powered particle counter in an enclosure configured to be carried by a user, a request for storing updated software configured to operate the particle counter, the particle counter comprising a battery, a light source, a light detector and a plurality of particle counting channels that count particles of different sizes in an airflow through the particle counter;

transmitting the request from the first microcontroller of the particle counter to a second microcontroller of the particle counter having inputs for the plurality of particle counting channels;

providing, at each of the first microcontroller and the second microcontroller, access from the external device to a respective non-volatile memory; and updating code, which is stored at the respective non-volatile memory, with new code received from the external device.

13. A particle counter comprising:
at least one processor;
at least one non-volatile memory that communicates with the at least one processor to store a bootloader program code;
at least one particle sensor that communicates with the at least one processor to count particles, the at least one particle sensor including a particle counter having a battery, a light source, a light detector and a microcontroller having a plurality of particle counting channels that count particles of different sizes; and
at least one external communication interface that communicates with the at least one processor, wherein the at least one external communication interface signals the particle counter to execute the bootloader program code to initiate a bootloader session and at least one of updated and new code is written to the at least one non-volatile memory; and
wherein the bootloader session installs at least one of a remote diagnostics and troubleshooting operation for the particle counter.

14. A optical particle counter device comprising:
a particle counter having at least one main processor and a particle sensor including a light detector and an amplifier, a battery and a power management circuit;
an internal communications interface;
at least one auxiliary processor in communication with the main processor through the internal communications interface;
a non-volatile memory in communication with the at least one auxiliary processor;
at least one particle sensor, which is in communication with at least one of the main processor and the at least one auxiliary processor, the at least one particle sensor having a light source, a light detector and a plurality of particle channels for detecting particles of different sizes in an airflow; and
at least one external communications interface in communication with the at least one main processor to connect the at least one main processor to an external device with a communication network,
wherein the at least one external communications interface signals the at least one main processor to execute a bootloader program code to initiate a bootloader session wherein data is transferred either to or from the non-volatile memory,
wherein data communicated to the non-volatile memory is encrypted,
wherein an internal communications interface allows bootloaded data to be read or written from the non-volatile memory, and
wherein the at least one external communications interface allows access to the particle counter for a remote diagnostic of the particle counter.

15. The optical particle counter device of claim 14, wherein the data transferred to or from the non-volatile memory over the at least one external communications interface is encrypted.

16. The optical particle counter device of claim 14 wherein the data transferred is configured to implement a user-customization of the particle counter.

17. The optical particle counter in claim 14, wherein a firmware option for the particle counter is enabled via the communications interface.

18. An optical particle counter comprising:
at least one processor;
at least one non-volatile memory, which is in communication with the at least one processor, for storing a bootloader program code;
at least one particle sensor, which is in communication with the at least one processor, the at least one particle sensor includes a particle counter having a light source, a light detector, a battery and a power management circuit for detecting particles; and
at least one external communication interface, which communicates with the at least one processor; and
wherein the at least one external communication interface signals the particle counter to execute the bootloader program code to initiate a bootloader session and new code is written to the at least one non-volatile memory including a user-customization of the particle counter.

19. The optical particle counter of claim 18 further comprising an air flow actuator such that an airstream flows through the particle counter.

20. The optical particle counter of claim 18 further comprising a microcontroller having a plurality of particle counting channels that counts particles of different sizes.

* * * * *